United States Patent
Gaeth et al.

[15] 3,674,895
[45] July 4, 1972

[54] POLYMERIZATION OF 1-OLEFINS WITH MULTIFUNCTIONAL INITIATOR SYSTEMS

[72] Inventors: Rudolf H. Gaeth, Lake Jackson, Tex.; Ralph C. Farrar, Bartlesville, Okla.

[73] Assignee: Phillips Petroleum Company

[22] Filed: May 12, 1969

[21] Appl. No.: 823,941

[52] U.S. Cl.................260/878 B, 252/431 N, 260/85.3 R, 260/94.9 R
[51] Int. Cl.................C08f 1/28, C08f 3/06, C08f 3/18
[58] Field of Search............260/94.9 R, 94.2 M, 878, 94.6, 260/84.7; 252/430, 431

[56] References Cited

UNITED STATES PATENTS

| | | | |
|---|---|---|---|
| 3,536,679 | 10/1970 | Langer, Jr. | 260/94.6 |
| 3,059,036 | 10/1962 | Honeycutt | 260/665 |
| 3,308,110 | 3/1967 | Pritchett | 260/94.2 |
| 3,377,404 | 4/1968 | Zelinski | 260/680 |
| 3,402,159 | 9/1968 | Hsieh | 260/85.1 |
| 3,402,162 | 9/1968 | Strobel | 260/94.2 |
| 3,451,988 | 6/1969 | Langer | 260/94.6 |
| 3,452,112 | 6/1969 | Kamienski | 260/665 |
| 3,492,369 | 1/1970 | Naylor | 260/879 |

Primary Examiner—Joseph L. Schofer
Assistant Examiner—A. Holler
Attorney—Young and Quigg

[57] ABSTRACT

1-Olefins are efficiently polymerized with an initiator system formed from an organomonolithium compound, a polyvinyl aromatic compound, an N,N,N',N'-hydrocarbyl-substituted ethylenediamine compound and optionally, a solubilizing monomer.

6 Claims, No Drawings

POLYMERIZATION OF 1-OLEFINS WITH MULTIFUNCTIONAL INITIATOR SYSTEMS

This invention relates to a novel process for efficiently polymerizing 1-olefins. In another aspect, this invention relates to a novel initiator system for polymerizing 1-olefins and in particular 1-monoolefins. In yet another aspect, this invention further relates to a process for producing branched homopolymers or copolymers from 1-olefin monomers.

It is well known that lithium-based polymerization initiators such as metallic lithium and hydrocarbyllithiums are very effective for the polymerization of conjugated dienes such as 1,3-butadiene but less so for monoolefins. In fact, butyllithium can be used to polymerize 1,3-butadiene or isoprene in the presence of monoolefins without affecting the monoolefins.

It has now been discovered that an initiator system comprising (1) an organomonolithium compound (2) a polyvinyl aromatic compound, (3) and N,N, N',N'-hydrocarbyl-substituted ethylenediamine compound with the optional addition of solubilizing monomer comprising conjugated dienes or monovinyl-substituted aromatic compounds is surprisingly effective to polymerize 1-olefins including either mono- or diolefins to branched homopolymers or copolymers. These polymers surprisingly have relatively wider molecular weight distributions than are generally obtained with known organolithium initiators.

It is an object of this invention to provide a process for the efficient polymerization of 1-olefins and in particular 1-monoolefins. It is an object of this invention to provide a novel initiator system for polymerizing 1-olefins. It is an object of this invention to provide a process for polymerizing 1-olefins to polymers having relatively wider molecular weight distribution than polymers produced with ordinary organolithium initiators. It is a further object to provide a process for providing branched homopolymers or copolymers from 1-olefins. Other objects, advantages, and features of our invention will be apparent to those skilled in the art from the following discussion, examples, and claims.

According to this invention the organomonolithium compound and the polyvinyl aromatic compound are reacted together in the presence of an inert hydrocarbon or polar compound, or mixtures thereof. It is preferred that this reaction be conducted in the additional presence of a solubilizing monomer. The solubilizing monomer can also be added to the reaction product of the polyvinyl aromatic compound and the organomonolithium compound. The N,N,N',N'-hydrocarbyl-substituted ethylenediamine compound can be added during the reaction between the polyvinyl aromatic compound and the organomonolithium compound or admixed with their reaction product, or charged to the polymerization system as a separate initiator component.

The reaction between the organomonolithium compound and the polyvinyl aromatic compound produces a multifunctional polymerization initiator containing at least two carbon-lithium bonds. These initiators are branched with the branches being terminated with lithium constituents which serve as reaction sites for polymerization at multiple positions. By employing this multifunctional polymerization initiator with the N,N,N',N'-hydrocarbyl-substituted ethylenediamine initiator component, branched 1-monoolefin homopolymers or copolymers can be produced efficiently under moderate polymerization conditions. If only a portion of the lithium atoms contained in the multifunctional initiator are complexed as is the case when the amount of the amine groups provided by the N,N',N'-hydrocarbyl-substituted ethylene diamine compound is so regulated as to be insufficient to complex with all the lithium atoms of the multifunctional initiator, branches of conjugated diene polymer, polystyrene, or the like, can be formed at the remaining sites.

The addition of a solubilizing monomer to the reaction between the organomonolithium and polyvinyl aromatic compound, or to their reaction product, exerts a solubilizing action thereon and enhances the efficiency of the initiator produced. If the reaction is conducted in the presence of a conjugated diene solubilizing monomer the 1-olefin polymers finally produced will contain unsaturation and therefore are amenable to sulfur vulcanization.

Generally, conjugated dienes containing from four to 12 and preferably four to six carbon atoms per molecule and monovinyl-substituted aromatic compounds containing from eight to 20, preferably eight to 12, carbon atoms per molecule, such as styrene or alkylated styrenes, can be employed as solubilizing monomers. Mixtures of these compounds can also be employed. Exemplary solubilizing monomers are 1,3-butadiene; isoprene; piperylene; 2,3-dimethyl-1,3-butadiene; 1,3-octadiene; 4,5-diethyl-1,3-octadiene; styrene; 3-methylstyrene; 3,5-diethylstyrene; and the like.

The diluents employed for the reaction between the organomonolithium compound and the polyvinyl aromatic compound, as hereinbefore stated, are inert hydrocarbons or polar compounds, or mixtures thereof. Hydrocarbon diluents including paraffins, cycloparaffins, and aromatics, containing from about four to 10 carbon atoms per molecule generally are suitable. Exemplary hydrocarbons are propane, isobutane, n-pentane, isooctane, n-dodecane, cyclopentane, cyclohexane, methylcyclopentane, ethylcyclopentane, dimethylcyclopentane, ethylcyclohexane, benzene, toluene, xylene, ethylbenzene, naphthalene, and the like.

Exemplary polar compounds that can be employed and which do not inactivate the initiator system are ethers, thioethers and tertiary amines. Dimethyl ether, diethyl ether, ethyl methyl ether, ethyl propyl ether, di-n-propyl ether, di-n-octyl ether, dibenzyl ether, diphenyl ether, anisole, tetrahydrofuran, 1,2-dimethoxyethane, dioxane, paraldehyde, dimethyl sulfide, diethyl sulfide, di-n-propylsulfide, di-n-propylamine, tri-n-butylamine, trimethylamine, triethylamine, N,N-dimethylaniline, pyridine, quinoline, N-ethylpiperidine, N-methyl-N-ethylaniline, N-methylmorpholine, and the like, can be employed.

As hereinbefore stated the multifunctional initiator is prepared by contacting the organomonolithium compound and the polyvinyl aromatic compound. The mole ratio of the polyvinyl aromatic compound to the organomonolithium compound is generally in the range of about 0.1/1 to 2.0/1 preferably 0.25/1 to 1.5/1. The contacting is generally carried out at a temperature in the range of about 85° to 300°F. The particular time employed will generally depend upon the temperature employed and is usually in the range of about 5 seconds to 24 hours. If a solubilizing monomer is employed, from about 2 to 15 moles are provided per mole of the organomonolithium compound.

The amount of N,N,N',N'-hydrocarbyl-substituted ethylenediamine compound employed is from about 0.1 to 10 moles per each mole of organomonolithium compound employed in the initiator preparation.

The organomonolithium compounds employable according to this invention are represented by the formula RLi, wherein R is an aliphatic, cycloaliphatic, or aromatic hydrocarbon radical, or combinations thereof, preferably containing from two to 20 carbon atoms. Exemplary of these organomonolithium compounds are ethyllithium, n-propyllithium, isopropyllithium, n-butyllithium, sec-butyllithium, tert-octyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-heptyl-cyclohexyllithium, 4-cyclopentylbutyllithium, and the like. The alkyl-lithium compounds are preferred for employment according to this invention, especially those wherein the alkyl group contains from three to 10 carbon atoms.

The polyvinyl aromatic compounds that can be employed according to this invention are represented by any one of the following formulas:

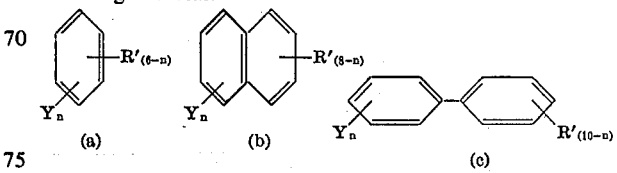

(a) (b) (c)

wherein Y is a vinyl group, and wherein each R' is hydrogen or an alkyl group containing from one to four carbon atoms with the total of the alkyl substituents containing not more than 12 carbon atoms, and wherein n is an integer of 2 or 3. The substituents in the above formulas (b) and (c) can be on either or both rings. The vinyl group Y can be represented by the following formula:

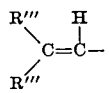

wherein R''' is hydrogen or an alkyl or cycloalkyl hydrocarbon radical containing one to six carbon atoms. Exemplary of suitable polyvinyl aromatic compounds are 1,2-divinylbenzene; 1,3-divinylbenzene; 1,4-divinylbenzene; 1,2,4-trivinylbenzene; 1,3-divinylnaphthalene; 1,8-divinylnaphthalene; 1,3,5-trivinylnaphthalene; 2,4-divinylbiphenyl; 3,5,7-trivinylnaphthalene; 1,2-divinyl-3,4-dimethylbenzene; 1,5,6-trivinyl-3,7-diethylnaphthalene; 1,3-divinyl-4,5-8-tributylnaphthalene; 2,2'-divinyl-4-ethyl-4'-propylbiphenyl; and the like.

The divinyl aromatic hydrocarbons containing up to 26 carbon atoms per molecule are preferred for employment according to this invention; particularly divinylbenzene in either its ortho, meta, or para isomer, and commercial divinylbenzene, which is a mixture of said isomers, is also quite satisfactory.

The N,N,N',N'-hydrocarbyl-substituted ethylenediamines employed in this invention can be represented by the formula

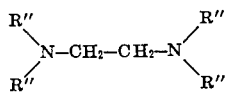

wherein R'' is a saturated alkyl, saturated cycloalkyl, or aryl radical, or combinations thereof, containing from one to 20 carbon atoms. The preferred compounds are those in which R'' is an alkyl, e.g. tetramethylethylenediamine; tetraethylethylenediamine; N,N-dimethyl-N',N'-di-n-butylethylenediamine; and the like.

The amount of the reaction product of the organomonolithium compound and the polyvinyl aromatic compound used in the polymerization process is generally in the range of about 0.1 to 100, preferably 1 to 30, milliequivalents of lithium per 100 grams of monomer (mehm) charged to the polymerization system. The milliequivalents of lithium can be conveniently determined by an alkalinity titration of a known volume of the reaction mixture containing the multifunctional initiator. Said alkalinity titration employs a standardized acid, e.g. HCl, and an indicator such as phenolphthalein to determine the end-point of titration. The alkaline normality thus obtained provides a value for the milliequivalents of lithium per milliliter of reaction mixture containing the multifunctional initiator. The alkalinity concentration (normality) thus determined is then employed for charging a known quantity of milliequivalents of lithium in polymerization recipes employing the multifunctional initiator. If the N,N,N',N'-hydrocarbyl-substituted ethylene-diamine compound is added during the reaction between the polyvinyl aromatic compound and the organomonolithium compound the alkalinity contributed by the amine compound must be taken into account during the titration by subtracting the alkalinity concentration thereof from the total normality of the known volume of the reaction mixture.

Polymerization conditions generally known to the art can be suitably employed. The polymerization temperature can vary over a broad range. Room temperature and above can be employed. Temperatures generally in the range of about 80° to 480°F preferably 120° to 300°F can be employed for 1-monoolefin polymerization. The pressures can vary over a broad range but should be generally sufficient to provide liquid monomeric material to permit initiator contact therewith. Diluents such as employed in initiator preparation can be employed in the polymerization process.

Various types of polymers can be prepared using the initiator system of this invention. A 1-monoolefin, or mixtures of two or more 1-monoolefins, can be polymerized; or a 1-monoolefin can be polymerized first and then a conjugated diene or monovinyl-substituted monomer such as styrene, vinylpyridine or the like can be added and polymerized. The charge order, of course, can be reversed, and mixtures of monomers can be employed. It is apparent that myriad polymers with a wide variation of properties can be produced which range from low molecular weight plastics to rubbers. The polymers of this invention have utility as wire and cable coatings, shoe soles, containers, hose, potting compounds, and the like.

The monomeric materials which can be polymerized according to this invention include 1-monoolefins containing from about two to 12, preferably up to eight, carbon atoms per molecule; or mixtures of the same; conjugated dienes containing four to 12, preferably four to eight carbon atoms per molecule; monovinyl-substituted aromatic compounds and monovinyl-substituted heterocyclic nitrogen compounds containing six to 20, preferably six to 12 carbon atoms per molecule.

Exemplary monomers include propylene, 1-butene, 1-pentene, 1-octene, ethylene, 4-methyl-1-pentene, and the like. Conjugated dienes employable are 1,3-butadiene; isoprene; 2,3-dimethyl-1,3-butadiene; 1,3-pentadiene; 2-methyl-3-ethyl-1,3-butadiene; 3-methyl-1,3-pentadiene; 2-ethyl-1,3-pentadiene; 1,3-hexadiene; 1,3-heptadiene; 2-phenyl-1,3-butadiene; 4,5-diethyl-1,3-octadiene; 2-methyl-3-isopropyl-1,3-butadiene; and the like. Exemplary vinyl-substituted aromatic compounds are 3-methylstyrene; 3,5-diethylstyrene; 4-n-propylstyrene; 4-dodecylstyrene; 4-cyclohexylstyrene; 4-phenylstyrene; 4-p-tolylstyrene; 2,4,6-tri-tert-butylstyrene; 4-methoxystyrene; 3,5-diphenoxystyrene; 3-ethyl-1-vinylnaphthalene; 6-isopropyl-1-vinylnaphthalene; 8-phenyl-1-vinylnaphthalene; 3,6-diethyl-2-vinylnaphthalene; 6-phenoxy-1-vinylnaphthalene; 3,7-dihexoxy-2-vinylnaphthalene; and the like. Exemplary vinyl-substituted heterocyclic nitrogen compounds are 2-vinylpyridine; 4-vinylpyridine; 3,5-diethyl-4-vinylpyridine; 5-methyl-2-vinylpyridine; 5-n-octyl-2-vinylpyridine; 4-phenyl-2-vinylpyridine; 3-benzyl-4-vinylpyridine; 4-phenoxy-2-vinylpyridine; 2-vinylquinoline; 4-vinylquinoline; 4-benzyl-3-vinylisoquinoline; and the like.

Illustrative of the foregoing discussion and not to be interpreted as a limitation on the scope thereof or on the materials herein employed the following examples are presented.

EXAMPLE I

Ethylene was polymerized in the presence of an initiator prepared from m-divinylbenzene, butadiene, sec-butyllithium and N,N,N',N'-tetramethyl-ethylenediamine. The recipe for the preparation of the initiator was as follows:

| | Parts by Wt. (Mmoles) |
|---|---|
| m-Divinylbenzene (DVB) | 9.1 (70) |
| 1,3-Butadiene | 25.0 (463) |
| Cyclohexane | 470 |
| sec-Butyllithium | 6.4 (100) |
| DVB:butyllithium mole ratio | 0.7:1 |
| Temperature, °F | 158 |
| Time, minutes | 40 |

The cyclohexane was charged to the reactor first followed by a nitrogen purge. Butadiene was added followed by the divinylbenzene and then the butyllithium. The temperature was adjusted to 158°F and maintained at this level for 40 minutes. The reaction mixture was cooled to 86°F and 300 millimoles of N,N,N',N'-tetramethylethylenediamine were added. The reaction mixture was held at room temperature for 10 minutes. The series of runs was conducted for the polymerization of ethylene using varying amounts of the initiator prepared as described above. In each of these runs 200 milliliters of cyclohexane and the initiator were charged to the reactor which was then pressurized to 50 psig with ethylene. The reaction mixture was allowed to remain at room temperature overnight, during which time the polymer precipitated. To the reaction mixture was added a 10 weight per cent solution of 2,2'-methylene-bis(4-methyl-6-tert-butylphenol) in a mixture of equal parts by volume of isopropyl alcohol and toluene. Isopropyl alcohol was added to the reaction mixture and the polymer recovered by evaporation of the diluent. The polymer yield and the amount of initiator employed in these runs are presented in Table I.

TABLE I

| Run No. | Initiator Level, (mehm)* g. atom Li charged | Polymer Yield, Grams |
|---|---|---|
| 1 | 0.8 | 0.9 |
| 2 | 1.6 | 1.9 |
| 3 | 2.4 | 2.8 |
| 4 | 3.2 | 3.2 |
| 5 | 4.0 | 3.8 |
| 6 | 4.8 | 4.6 |
| 7 | 5.6 | 4.9 |
| 8 | 6.4 | 5.8 |
| 9 | 7.2 | 6.4 |
| 10 | 8.0 | 7.0 |
| 11 | 8.8 | 7.6 |
| 12 | 9.6 | 8.2 |

*milliequivalents of lithium per 100 grams of monomer.

The polymeric products produced were solid polymers which contained branched structures and unsaturation. The above data demonstrate that ethylene can be polymerized at relatively low temperatures and pressures using the multifunctional initiators of this invention.

EXAMPLE II

Ethylene was polymerized in the presence of an initiator prepared from divinylbenzene, butadiene, sec-butyllithium and N,N,N',N'-tetramethylethylene-diamine with the amine compound being charged to the polymerization reactor with the reaction product of the divinylbenzene and sec-butyllithium. The multifunctional initiator was prepared according to the following recipe:

| Divinylbenzene, Parts by Weight | 0.91 |
|---|---|
| Butadiene, Parts by Weight | 2.50 |
| Cyclohexane, Parts by Weight | 50 |
| sec-Butyllithium, mhm* | 10.0 |
| Temperature, °F | 158 |
| Time, Min. | 45 |

*Gram millimoles per 100 grams monomer.

The cyclohexane was charged to the reactor first followed by a nitrogen purge. The butadiene was added followed by the divinylbenzene and then the butyllithium. The temperature was adjusted to 158°F and maintained at this level for 45 minutes. A series of runs was conducted for the polymerization of ethylene using variable amounts of the initiator prepared as described above. The polymerization recipe was as follows:

| Ethylene: See Table II | |
|---|---|
| Butadiene, Parts by weight | 100 |
| Cyclohexane, Parts by weight | 760 |
| Initiator, (mehm) | 10 |
| N,N,N',N'-tetramethylethylene-diamine (TMEDA) (mhm) | 10 |
| Temperature, °F | 122 |
| Time, Min. | 15$^a$ |

$^a$time for butadiene polymerization only.

As control runs (1 and 3) sec-butyllithium was substituted for the initiator component comprising the divinylbenzene and sec-butyllithium reaction product. The results of the polymerization are reported in Table II.

The polymerization runs were made in a 1 liter stirred reactor. In these runs cyclohexane was charged to the reactor first followed by a nitrogen purge. Butadiene was added and the temperature adjusted to 122°F. The initiator and TMEDA were added next and the butadiene polymerized after which ethylene was pressurized in the reactor and the reaction continued for the time shown in Runs 3 and 4. The difference of time in these runs was an arbitrary difference arising from experimental expediency and it is felt that the difference in the yield of polymer in these runs reflects only the difference in the reaction time.

TABLE II

| Run No. | Initiator type | Ethylene, minutes at 600 p.s.i.g. | Polymer, grams | Inherent$^a$ viscosity | Gel,$^a$ percent | Heterogeneity$^b$ index |
|---|---|---|---|---|---|---|
| 1 | sec-BuLi | | 45.4 | 0.21 | 0 | 1.26 |
| 2 | Multifunctional | | 45.8 | 0.42 | 0 | 1.78 |
| 3 | sec-BuLi | 90 | 58.5 | 0.25 | 0 | 1.41 |
| 4 | Multifunctional | 45 | 51.3 | 0.34 | 76 | 2.9 |

$^a$ Determined according to the procedure of U.S. 3,278,508, col. 20, notes a and b.
$^b$ Ratio of weight average molecular weight (Mw) to number average molecular weight (Mw) as determined by gel permeation chromatography (GPC).

The results of Runs 1 and 2 demonstrate that both initiators are of comparable activity in butadiene polymerization although the molecular weight (inherent viscosity) of the product produced with the multifunctional initiator made according to this invention is significantly higher than the product made from sec-butyllithium. The larger heterogeneity index of the product from Run 2 when compared to the product of Run 1 further demonstrates that molecular weight distribution is broader for the polybutadiene produced according to this invention. A comparison of the results from Runs 3 and 4 demonstrate that the product produced according to this invention is a significantly higher molecular weight polymer and has a broader molecular weight distribution than when sec-butyllithium was employed as the initiator. Advantages such as increased ease of processability of such block copolymers produced according to this invention can thus be obtained.

As will be evident to those skilled in the art, various modifications of this invention can be made or followed, in light of the disclosure and discussion herein set forth without departing from the scope and spirit thereof.

We claim:

1. A polymerization process for 1-olefins which comprises contacting under polymerization conditions polymerizable monomers comprising at least one 1-olefin containing from about two to 12 carbon atoms per molecule with a multifunctional polymerization initiator system, wherein said multifunctional polymerization system comprises (I) a multilithium polymerization initiator containing at least two carbon-lithium bonds, and (II) an N,N,N',N'-hydrocarbyl-substituted ethylene diamine compound, wherein said (I) multilithium polymerization initiator is the product formed on reacting components consisting essentially of (a) an organo monolithium compound, (b) a polyvinyl aromatic compound, and (c) a solubilizing monomer, in the presence of (d) an inert hydrocarbon or polar compound, wherein said (a) organo monolithium compound is represented by RLi wherein R contains from two to 20 carbon atoms and is an aliphatic, cycloaliphatic, or aromatic hydrocarbon radical, or combination thereof, said (b) polyvinyl aromatic compound is represented by

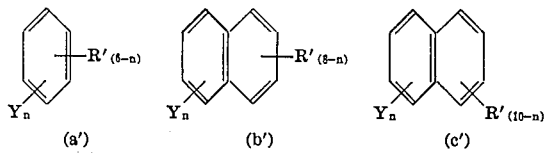

wherein $y$ is a vinyl group, each R' is hydrogen or alkyl containing from one to four carbon atoms such that the total of alkyl substituent contains not more than 12 atoms, $n$ is an integer and is 2 or 3, and the substituents in the above formulas (b') or (c') can be on either or both rings;

said (c) solubilizing monomer is a conjugated diene containing from four to 12 carbon atoms per molecule, monovinyl-substituted aromatic compound containing from eight to 20 carbon atoms per molecule, or mixture hereof, said (II) N,N,N',N'-hydrocarbyl-substituted ethylene diamine compound is represented by

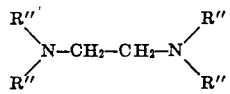

wherein R'' contains up to 20 carbon atoms and is alkyl, cycloalkyl, or aryl radical, or combination thereof, wherein the mole ratio of said (b) polyvinyl aromatic compound to said (a) organo monolithium compound is in the range of about 0.1:1 to 2:1, the amount of said (II) N,N,N',N'-hydrocarbyl-substituted ethylene diamine compound employed provides from about 0.1 to 10 moles per each mole of said (a) organo monolithium compound employed, and wherein the mole ratio of said (c) solubilizing monomer to said (a) organo monolithium compound is in the range of about 0.1:1 to 10:1, and wherein said multifunctional polymerization initiator system is employed in an amount sufficient to provide in the range of about 0.1 to 100 milliequivalents of lithium per 100 grams of said polymerizable monomers charged to the polymerization system.

2. The polymerization process of claim 1 wherein said amount of multifunctional polymerization initiator system is sufficient to provide in the range of about 1 to 30 milliequivalents of said lithium per 100 grams of said polymerizable monomers charged to said polymerization system; wherein said polymerization conditions include a temperature range of about 80°F to 480°F, sufficient pressure to permit liquid monomeric materials and initiator to contact, and wherein at least one said 1-olefin is a monoolefin containing up to eight carbon atoms per molecule.

3. The polymerization process of claim 2 wherein said polymerization process includes the addition of at least one further monomer member selected from the group consisting of monovinyl-substituted aromatic compounds containing up to 20 carbon atoms per molecule, monovinyl-substituted heterocyclic nitrogen compounds containing up to 20 carbon atoms per molecule, and conjugated dienes of up to 12 carbon atoms per molecule.

4. The polymerization process of claim 3 wherein said polymerization temperature is conducted in the range of from about 120°F to 300°F, said 1-olefin is ethylene, said at least one further monomer is styrene or butadiene, and wherein said polymerization is conducted in the presence of an inert hydrocarbon diluent.

5. The polymerization process of claim 1 wherein in said (II)(c) solubilizing monomer said conjugated diene contains from four to six carbon atoms per molecule and said monovinyl-substituted aromatic compound contains from eight to 12 carbon atoms per molecule; and wherein said (d) inert hydrocarbon diluent contains from four to 10 carbon atoms per molecule, or said inert polar diluent is ether, thioether, or tertiary amine.

6. The polymerization process of claim 5 wherein said (II) (b) polyvinyl aromatic compound is divinylbenzene, said (a) organomonolithium compound is sec-butyllithium, said (c) solubilizing monomer is butadiene, and said (II) N,N,N', N'-hydrocarbyl-substituted ethylene diamine compound is N,N,N', N'-tetramethylethylenediamine.

* * * * *

UNITED STATES PATENT OFFICE

18625 LHC

CERTIFICATE OF CORRECTION

Patent No. 3,674,895       Rudolf H. Gaeth et al       Dated: July 4, 1972

It is certified that error appears in the above-identified patent and that said Letters Patent are hereby corrected as shown below:

Claim 1, column 7, line 25, after "12" and before "atoms" should be

--- carbon ---;

line 32, "hereof" should read --- thereof ---.

Claim 5, column 8, line 35, after "claim" and before "wherein" should be --- 4 --- deleting "1".

Signed and sealed this 14th day of November 1972.

(SEAL)
Attest:

EDWARD M. FLETCHER, JR.
Attesting Officer

ROBERT GOTTSCHALK
Commissioner of Patents